United States Patent [19]

Dellora et al.

[11] Patent Number: 5,444,980

[45] Date of Patent: Aug. 29, 1995

[54] ELECTRONIC CONTROL SYSTEM FOR A VARIABLE GEOMETRY TURBOCOMPRESSOR FOR AN ENGINE PROVIDED WITH A CONTINUOUS BRAKING DEVICE

[75] Inventors: Giancarlo Dellora, Settimo Torinese; Paolo Polverelli, Civitella Marittima, both of Italy

[73] Assignees: Iveco Fiat S.p.A., Turin, Italy; Nissan Diesel Motor Co., Ltd., Saitama, Japan

[21] Appl. No.: 158,926

[22] Filed: Nov. 26, 1993

[30] Foreign Application Priority Data

Nov. 27, 1992 [IT] Italy ................. TO92A0965

[51] Int. Cl.$^6$ ............................................. F02D 23/00
[52] U.S. Cl. ................................... 60/602; 123/321; 364/431.04
[58] Field of Search .................. 123/321; 60/602; 364/431.04

[56] References Cited

U.S. PATENT DOCUMENTS

| | | | |
|---|---|---|---|
| 4,395,884 | 8/1983 | Price ........................ | 60/602 |
| 4,474,006 | 10/1984 | Price et al. ................ | 60/602 |
| 4,660,382 | 4/1987 | Ueno ........................ | 60/602 |
| 4,932,372 | 6/1990 | Meneely .................... | 60/602 |

FOREIGN PATENT DOCUMENTS 2391358 5/1978 France .
63-289220 11/1988 Japan .
11078752 7/1989 Japan .

OTHER PUBLICATIONS

Patent Abstracts of Japan, vol. 13, No. 100 (M-805) Mar. 9, 1989.
Patent Abstracts of Japan, vol. 13, No. 462, (M-881) Oct. 19, 1989.

*Primary Examiner*—Richard A. Bertsch
*Assistant Examiner*—Charles G. Freay
*Attorney, Agent, or Firm*—Ladas & Parry

[57] ABSTRACT

Electronic control system for a variable geometry turbocompressor applied to a diesel engine provided with a continuous braking device. The system is provided with a selector which may be manually actuated and by of which it is possible to control the engagement/disengagement of the continuous braking device and it is possible to select a first braking mode according to which the speed of the engine is maintained substantially constant by controlling the turbocompressor and a second braking method in which the continuous braking device provides the maximum braking power.

13 Claims, 4 Drawing Sheets

ELECTRONIC CONTROL SYSTEM FOR A VARIABLE GEOMETRY TURBOCOMPRESSOR FOR AN ENGINE PROVIDED WITH A CONTINUOUS BRAKING DEVICE

BACKGROUND OF THE INVENTION

The present invention relates to an electronic control system for a variable geometry turbocompressor (VGT) applied to a diesel engine provided with a continuous braking device.

Continuous braking devices are known and comprise one or more actuators adapted to control a supplementary opening of the exhaust valves of the diesel engine, or the opening of auxiliary valves in order to dissipate the compression energy produced in the cylinders.

Electronic devices are also known which receive as an input a plurality of signals measured in the engine and generate a piloting signal supplied to an actuator which regulates the geometry of the turbine of the compressor by modifying the operating characteristics of the turbocompressor.

SUMMARY OF THE INVENTION

The object of the present invention is to provide an electronic system which makes it possible to use a variable geometry turbocompressor both to supercharge the engine and to control the braking action of a continuous braking device.

This object is achieved by the present invention which provides an electronic control system for a variable geometry turbocompressor (VGT) applied to an internal combustion engine; the engine being provided with a continuous braking device adapted to modify the normal operation of the engine so as to cause the engine to operate substantially as an air compressor dissipating energy, characterized in that the control system comprises electronic control means for controlling the variable geometry turbocompressor (VGT) to modify the geometric characteristics of the turbocompressor in order to modulate the braking action provided by the continuous braking device.

BRIEF DESCRIPTION OF THE DRAWINGS

The invention is described in detail with particular reference to the accompanying drawings, in which.

DETAILED DESCRIPTION OF THE INVENTION

Figure 1:
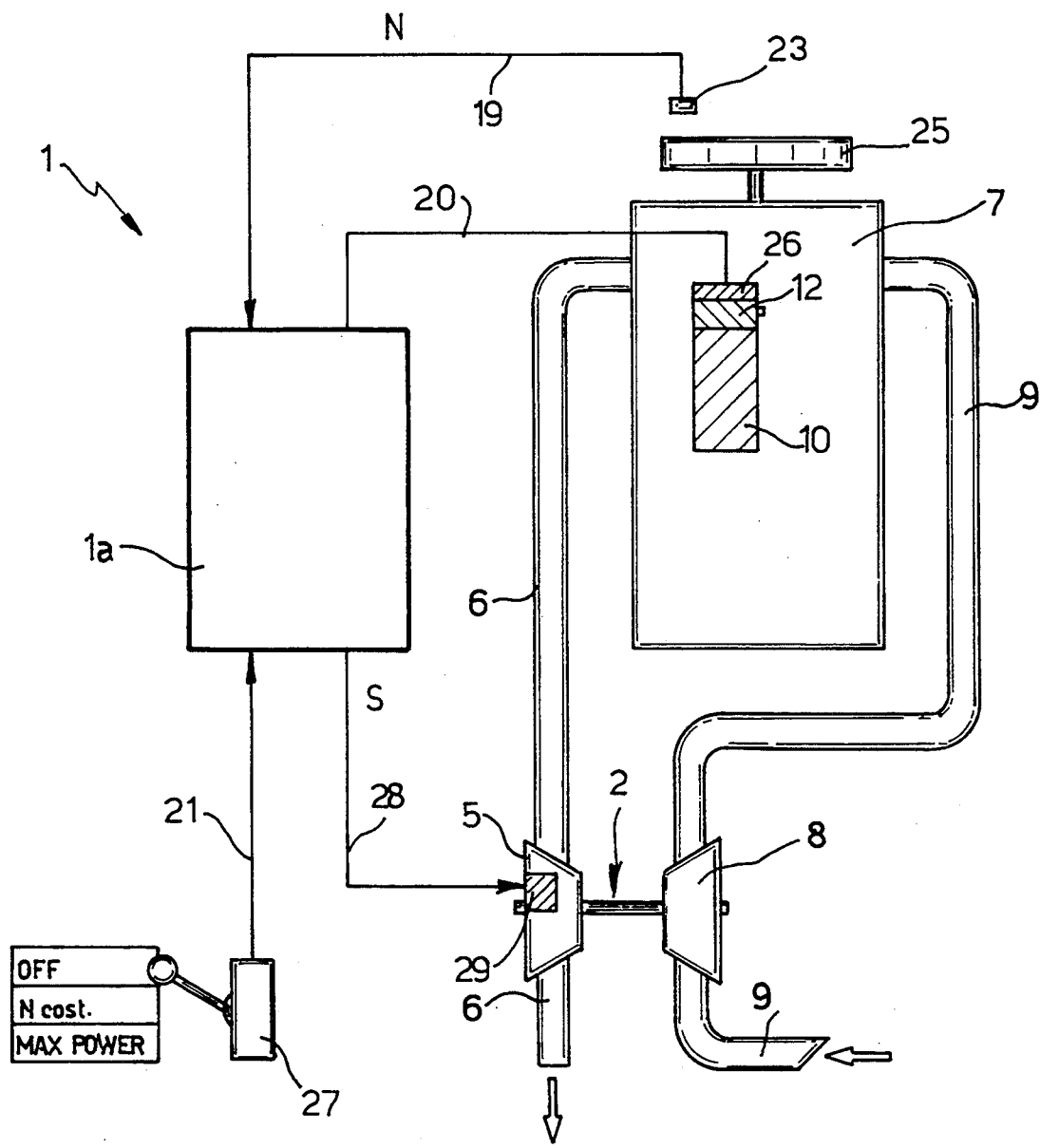
FIG. 1 is a diagrammatic illustration of a diesel engine provided with a continuous braking device and a variable geometry turbocompressor controlled by an electronic unit operating according to the system of the present invention.

With particular reference to FIG. 1, an electronic control system, shown overall by 1, operates in a central electronic unit 1a which controls a variable geometry turbocompressor (VGT) 2 comprising a turbine 5 disposed along an exhaust duct 6 of a diesel engine 7 and actuating a compressor 8 disposed along a suction duct 9 of the engine 7.

The engine 7 is provided with a continuous braking device 10 (shown diagrammatically) which is adapted to control the opening of auxiliary valves (not shown), in order to dissipate the compression energy produced in the cylinders (not shown) of the engine 7.

The auxiliary valves are actuated by a hydraulic circuit (not shown) provided with a control electrovalve 12 which moves between a first normal operating position of the engine 7 in which the continuous braking device 10 is disactivated and a second position in which the auxiliary valves are open and the engine 7 operates substantially as an air compressor thereby dissipating energy.

The electronic unit 1a is connected, via respective lines 19, 20 and 21, to a sensor 23 of engine speed (N) disposed opposite the flywheel 25 of the engine 7, to a position sensor 26 of the ON-OFF type coupled to the electrovalve 12 and to a braking mode selector device 27.

The output of the electronic unit 1a is also connected via a line 28 to an actuator 29 (for instance a servomotor) which modifies the geometric characteristics of the turbine 5 in accordance with a piloting signal S supplied by the electronic unit 1a.

The actuator 29 regulates the opening of a nozzle via which the exhaust gases flow before striking the rotor of the turbine 5; a decrease in the piloting signal S reduces the cross-section of the nozzle and increases the speed of the gases striking the turbine such that the speed of rotation of the turbocompressor increases.

The selector device 27 is housed in the driving cabin (not shown) of an industrial vehicle (not shown) and has three selection positions: a first position (engine-brake disactivated) in which the braking device 10 is deactivated; a second position (braking at a constant) in which the braking device 10 is actuated and the turbine 5 is controlled so as to maintain the speed of rotation of the engine 7 substantially constant; and a third position maximum (braking) in which the braking device 10 is actuated and the turbine 5 is controlled so as to provide the maximum braking power.

Figure 2:
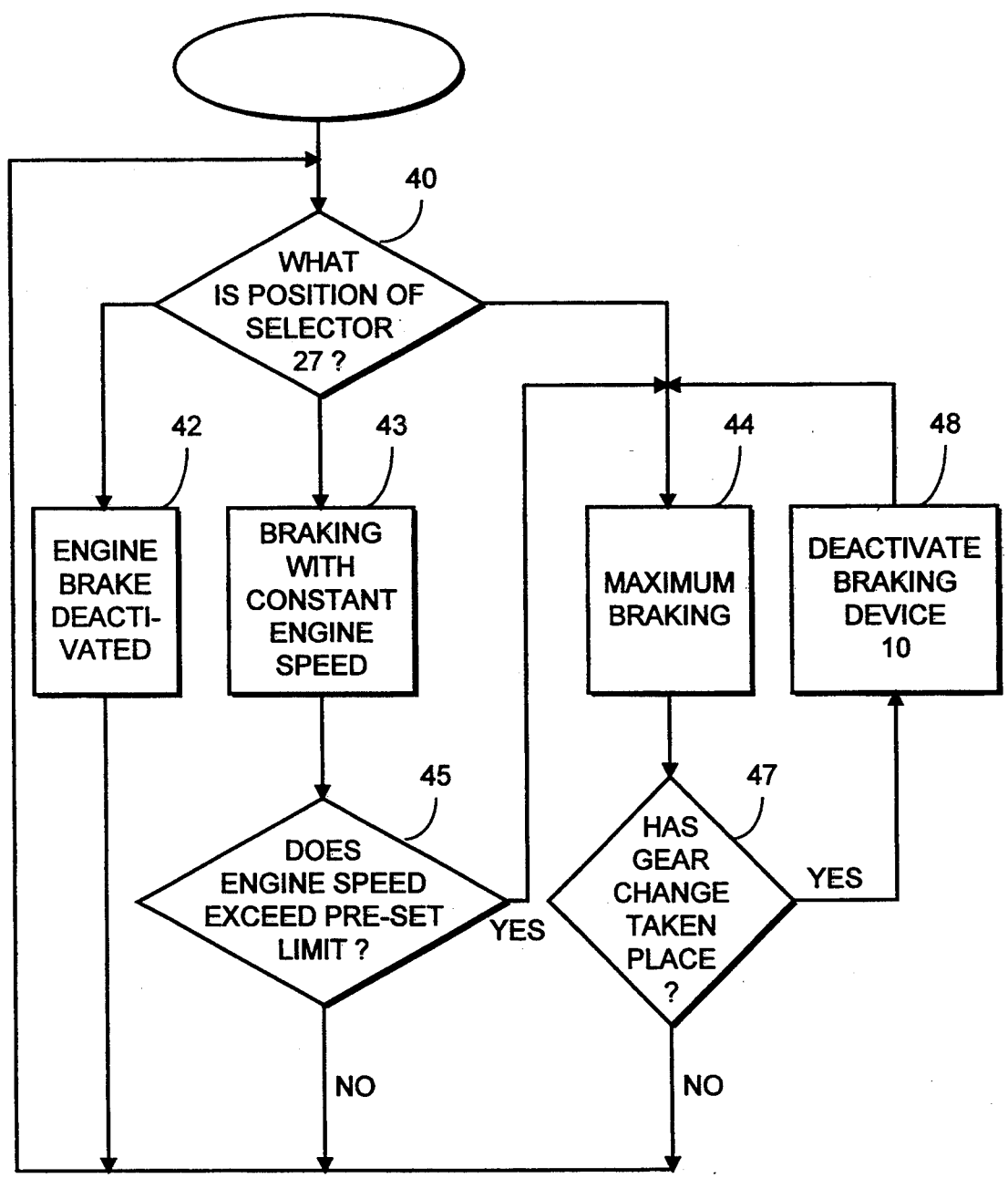
FIG. 2 is a logic block diagram of the operation of the electronic unit of FIG. 1.

FIG. 2 shows a logic block diagram of the operation of the electronic unit 1a.

The first block 40 monitors the position assumed by the selector device 27; in particular, depending on whether the selector device 27 is disposed in the first, second or third position, there is a transition from the block 40 to a block 42, 43 or 44 respectively. The block 42 (engine-brake deactivated) deactivates, if actuated, the continuous braking device 10 and controls in a known manner the compressor 5 which supercharges the engine 7 on the basis of feedback signals (engine speed and supercharging pressure) measured in the engine 7; transition further takes place from block 42 to the block 40.

The block 43 (braking with a constant engine speed) actuates the continuous braking device 10 by acting on the electrovalve 12 and selects a first control circuit 10a (FIG. 3) which drives the compressor 5 in order to maintain the speed of rotation N of the engine 7 substantially constant and equivalent to the speed at the time of the selection of this operational mode. Transition takes place from block 43 to block 45 where it is checked whether or not the speed N of the engine exceeds a previously stored limit value; if so, there is a transition from the block 45 to the block 44, otherwise transition is to the block 40.

The block 44 (maximum braking) actuates the continuous braking device 10 (if this has not already been actuated) by acting on the electrovalve 12 and selects a second circuit 10b (FIG. 4) which controls the compressor 5 in order to generate the maximum braking power. Transition takes place from the block 44 to a block 47 where it is checked whether or not a gear change has taken place; if not, transition takes place from the block 47 to the block 40, otherwise transition is to a block 48 which disactivates the continuous braking device 10 during the gear change operation. Transition finally takes place from the block 48 to the block 44.

Figure 3:
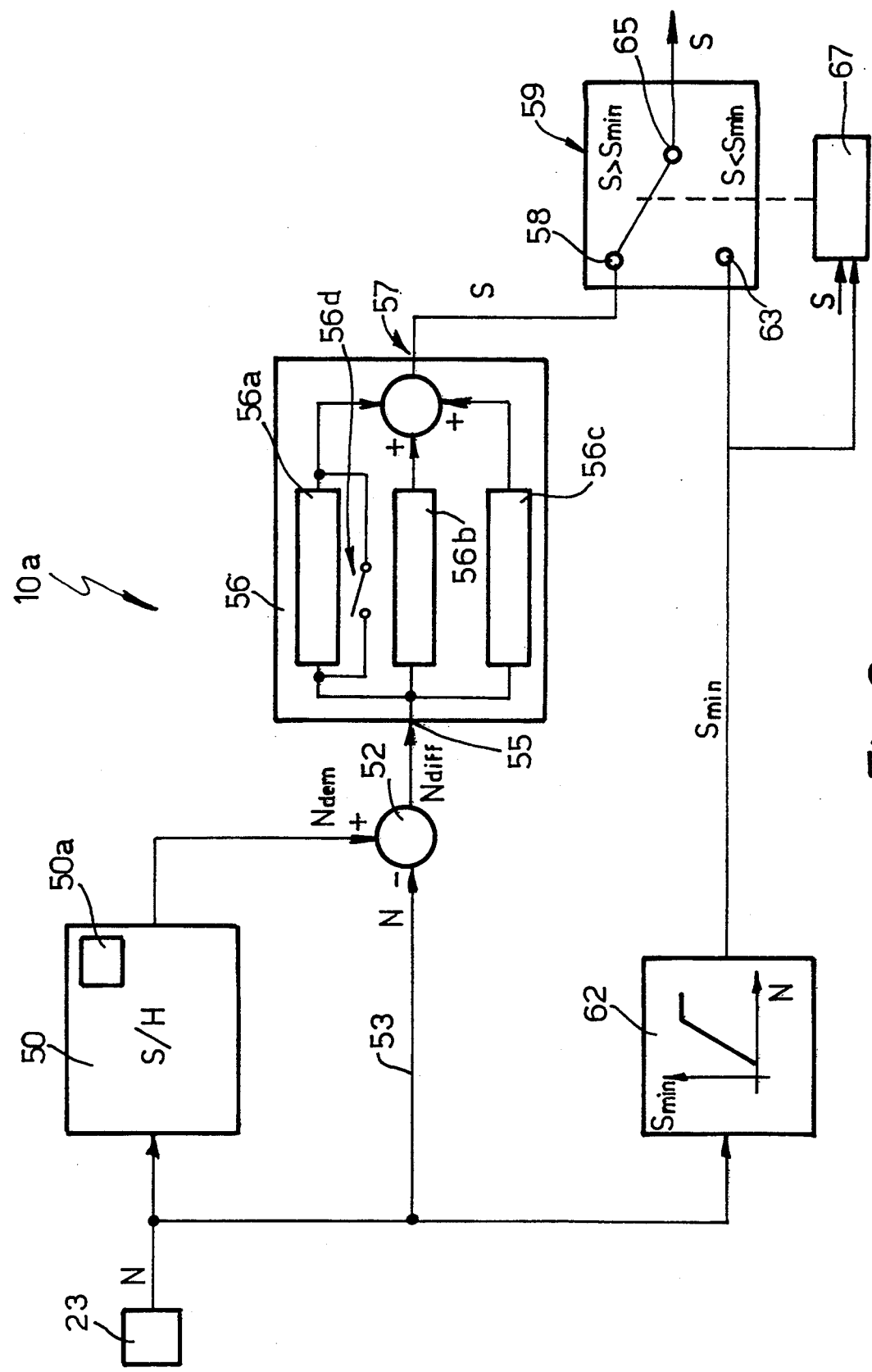
FIG. 3 is a detailed view of a first circuit of the electronic unit of FIG. 1.

FIG. 3 shows the circuit 10a in detail.

The circuit 10a comprises a circuit 50 of the SAMPLE & HOLD type whose input is connected to the sensor 23 and whose output is connected to a first summing input (+) of a summing node 52 having a second subtracting input (−) connected directly to the sensor 23 via a line 53. The summing node 52 has an output connected to an input 55 of a processing circuit 56 which has an output 57 connected to a first input 58 of an electronic diverter 59. The circuit 10a also comprises a calculation unit 62 which has an input connected to the sensor 23 and an output connected to a second input 63 of the electronic diverter 59.

The calculation unit 62 comprises an electronic map which associates, for each value of the signal N generated by the sensor 23, a single value of an output signal Smin which represents, for a specific speed N of the engine 7, the limit value of the piloting signal which may be supplied to the actuator 29 without excessively stressing the turbocompressor 2.

The diverter 59 also has an output 65 which supplies a piloting signal S to the actuator 29 and is actuated by an electronic actuator 67 which receives as an input the piloting signal S present at the output 57 of the circuit 56. In particular, if the piloting signal S is greater than a limit value Smin the diverter 59 connects the output 65 to the input 58, otherwise the output 65 is connected to the input 63.

The processing circuit 56 comprises an integrator-multiplier circuit 56a, a shunter-multiplier circuit 56b and a multiplier circuit 56c disposed in parallel to one another and having inputs and outputs connected respectively to the input 55 and the output 57 of the processing circuit 56.

The processing circuit 56 further comprises an electronic switch 56d disposed in parallel with the integrator-multiplier circuit 56a and actuated synchronously with the diverter 59 so that the switch 56d is closed when the output 65 is brought into contact with the input 63 and is open when the output 65 is brought into contact with the input 58.

Figure 4:
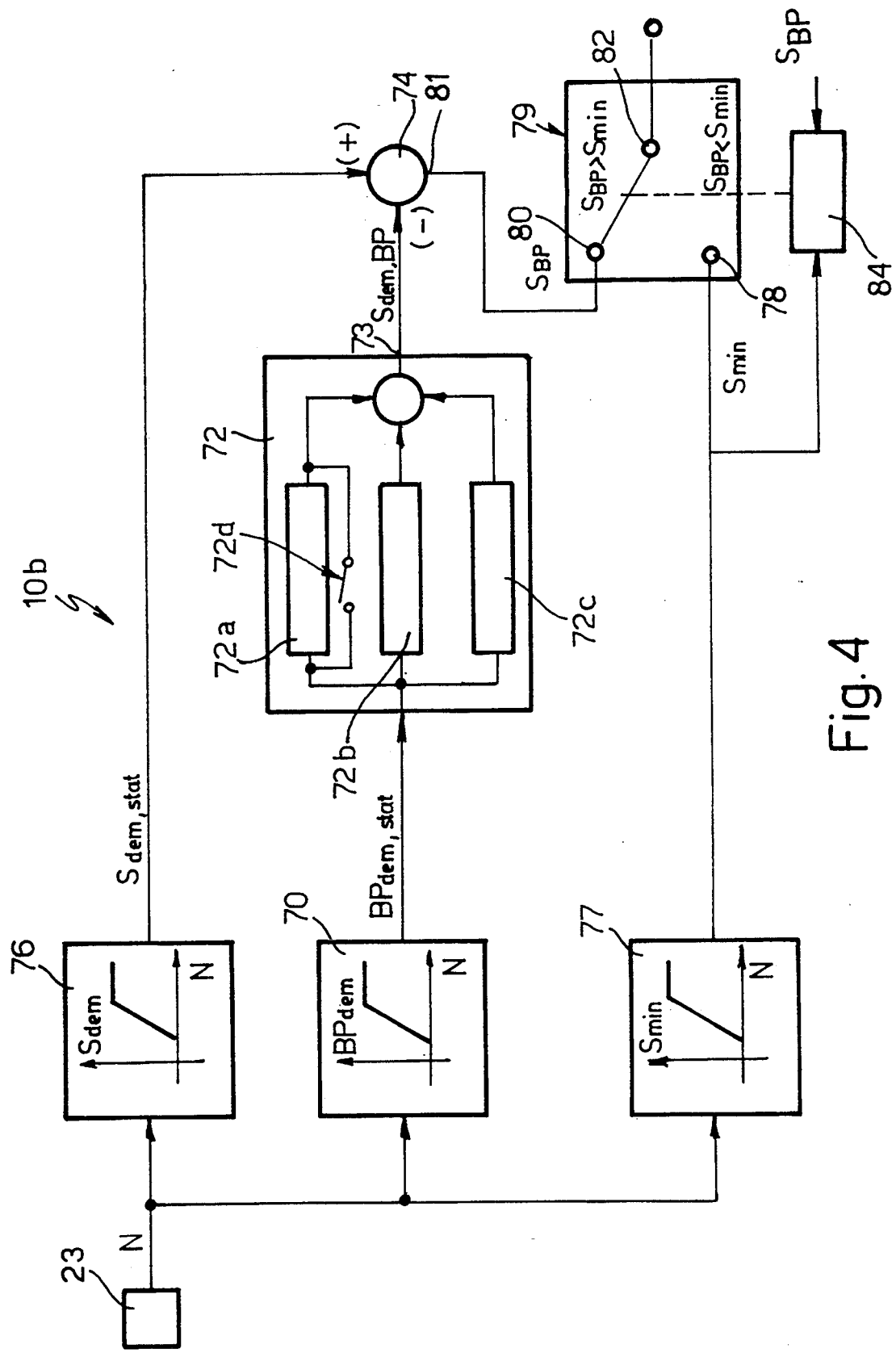
FIG. 4 is a detailed view of a second circuit of the electronic unit of FIG. 1.

With particular reference to FIG. 4, the circuit 10b comprises a calculation unit 70 whose input is connected to the sensor 23 and whose output is connected to the input of a processing circuit 72 having an output 73 connected to the subtracting input (−) of a node 74. The processing circuit 72 comprises an integrator-multiplier circuit 72a, a shunter-multiplier circuit 72b and a multiplier circuit 72c disposed in parallel to one another and having inputs and outputs connected respectively to the input and the output 73 of the processing circuit 72. The processing circuit 72 further comprises an electronic switch 72d disposed in parallel with the integrator-multiplier circuit 72a and adapted to short-circuit it by the methods explained below.

The circuit 10b further comprises a calculation unit 76 whose input is connected to the sensor 23 and whose output is connected to a summing input (+) of the node 74. The calculation units 70 and 76 comprise electronic maps which associate, for each value of the input signal N, a single value of an output signal BPdem,stat and Sdem,stat which respectively represent the estimated value of the supercharging pressure and the estimated value of the piloting signal of the actuator 29.

The sensor 23 is further connected to the first input of a calculation unit 77 having an output connected to a first input 78 of an electronic diverter 79 having a second input 80 connected to an output 81 of the node 74. The calculation unit 77 comprises an electronic map which associates, for each value of the input signal N, a single value of an output signal Smin which represents the limit value of the piloting signal which may be supplied to the actuator 79 without excessively stressing the compressor 5.

The electronic diverter 79 also has an output 82 which supplies the actuator 29 and is controlled by an electronic actuator 84 which receives as input the measurement of the piloting signal SBP output from the node 74.

In particular, if the piloting signal SBP is greater than a limit value Smin, the diverter 79 connects the output 82 with the input 80, otherwise the output 82 is connected with the input 78. The switch 72d, moreover, is closed when the output 82 is connected with the input 78 and is open when the output 82 is connected with the input 80.

In operation, the operator selects the braking mode by manual action on the selector 27.

If the selector 27 is disposed in the first position, as mentioned above, the continuous braking device 10 is not actuated and the turbocompressor 2 supercharges the engine 7 in a known manner.

If the operator places the selector 27 in the second position (braking with a constant engine speed) the continuous braking device 10 and the circuit 10a are actuated. In this case, the electrical signal generated by the sensor 23 is sampled at the time of actuation of the circuit 10a and is stored (Ndem) by the circuit 50 in a RAM memory 50a (shown diagrammatically).

The stored value Ndem is supplied to the node 52 where it is compared with the instantaneous signal N generated by the sensor 23; the node 52 consequently supplies as an output an error signal Ndiff=Ndem−N which represents the discrepancy between the speed of rotation N of the engine 7 and the required value Ndem. This error signal Ndiff is then processed by the circuit 56 which generates the piloting signal S which compensates the increase in the error signal Ndiff (and therefore the increase in the speed of the engine 7) by acting on the compressor 5 and consequently increasing the braking power supplied by the engine 7. In this way the speed of the motor engine 7 is reduced to a value close to the stored value.

During the method of operation at a constant engine speed, when the piloting signal S drops below the stored limit value Slim, the diverter 59 deactivates the circuit 56 and actuates the calculation unit 62 which supplies the signal Slim to the actuator 29 thereby preventing the turbocompressor 2 from being excessively stressed.

If the operator places the selector 27 in the third position (maximum braking) the continuous braking device 10 and the circuit 10b are actuated.

In this case, the calculation unit 76 generates a signal Sdem, stat which represents the estimated value of the piloting signal S of the actuator 29 for a specific speed N of the engine 7, while the calculation unit 70 generates a signal BPdem,stat which represents the estimated value of the supercharging pressure for this speed N of the engine 7.

The signal BPdem,stat generated by the unit 70 is then processed by the unit 72 and reaches the node 74 where it is added (sign inverted) to the signal Sdem,stat produced by the unit 76, generating a piloting signal SBP which supplies the actuator 29.

During the maximum braking operating method, moreover, the diverter 79 selects the circuit 77 when the piloting signal SBP drops below the stored limit value Slim thereby preventing the turbocompressor 2 from being excessively stressed.

It is clear from the above that the electronic system of the present invention improves the operation of a continuous braking device of known type as it enables a number of braking modes which may be selected by the vehicle driver.

This system also makes it possible to use the turbocompressor in normal driving conditions of the vehicle in order to supercharge the engine as well as during braking in order to control the continuous braking device.

Selection of the braking method with a constant engine speed speed, moreover, makes it possible to maintain the speed of the vehicle substantially constant, while the maximum braking method allows for the best possible use of the continuous braking device.

The electronic diverters 79 and 59 and the monitoring carried out on the piloting signal S, moreover, prevent the turbocompressor from being excessively stressed.

It is evident that modifications and variants may be made to the present system without thereby departing from the protective scope of the invention.

What is claimed is:

1. An electronic control system for a variable geometry turbocompressor (VGT) (2) applied to an internal combustion engine (7), said engine (7) being provided with a continuous braking device (10) adapted to modify the normal operation of the engine (7) so as to cause the engine to operate substantially as an air compressor dissipating energy, said control system comprising electronic control means (10a, 10b) for controlling the variable geometry turbocompressor (VGT) to modify geometric characteristics of the turbocompressor (2) in order to modulate braking action provided by the continuous braking device (10), said control means comprising electronic means (10a) adapted to regulate the geometric characteristics of the turbocompressor (2) in order to maintain speed (N) of the engine (7) substantially constant.

2. A system as claimed in claim 1, wherein said electronic means (10a) comprises sensor means (23) coupled to a rotary member (25) of the engine (7) and adapted to supply a measurement signal of the speed (N) of the engine (7), sampling means (50) receiving the measurement signal (N) and adapted to store this signal (Ndem) at least at one selection instant, comparison means (52) receiving the measurement signal (N) generated by the sensor means (23) and a signal output from the sampling means (50), the comparison means (52) generating as an output a difference signal (Ndiff) between the signal (Ndem) from the sampling means and the measurement signal (N), processing means (56) having an input (55) connected to the output of the comparison means (52) to receive the difference signal (Ndiff) therefrom, the processing means (56) generating as an output (57) a piloting signal (S) supplied to the variable geometry turbocompressor (VGT) (2).

3. A system as claimed in claim 2, wherein the processing means (56) comprises integrator-multiplier means (56a), shunter-multiplier means (56b) and multiplier means (56c) connected in parallel with one another and interposed between the input (55) and the output (57) of the processing means (56).

4. A system as claimed in claim 3, further comprising switch means (56d) connected in parallel with the integrator-multiplier means (56a) to selectively short circuit the integrator-multiplier means (56a).

5. A system as claimed in claim 4, wherein said electronic means (10a) further comprises calculation means (62) receiving as an input signal (N) and generating as an output a signal (Smin) representing, for each value of the input signal, a limit value of the piloting signal which may be supplied to the variable geometry turbocompressor (2) without excessive stressing of the turbocompressor.

6. A system as claimed in claim 5, further comprising electronic diverter means (59) having at least first and second inputs (63, 58) connected respectively to the output of the calculation means (62) and the output (57) of the processing means (56), the diverter means (59) having an output (65) which may be selectively connected with the first (63) and the second (58) inputs and is adapted to supply a control signal to the turbocompressor (2).

7. A system as claimed in claim 6, further comprising control means (67) for the electronic diverter means (59), said control means (67) receiving as an input the piloting signal and controlling switching of the diverter means (59) when the piloting signal (S) reaches a threshold value (Slim).

8. A system as claimed in claim 7, wherein said switch means (56d) are actuated synchronously with the diverter means (59).

9. An electronic control system for a variable geometry turbocompressor (VGT) (2) applied to an internal combustion engine (7), said engine (7) being provided with a continuous braking device (10) adapted to modify the normal operation of the engine (7) so as to cause the engine to operate substantially as an air compressor dissipating energy, said control system comprising electronic control means (10a, 10b) for controlling the variable geometry turbocompressor (VGT) to modify geometric characteristics of the turbocompressor (2) in order to modulate braking action provided by the continuous braking device (10), said control means comprising first electronic means (10a) adapted to regulate the geometric characteristics of the turbocompressor (2) in order to maintain the speed (N) of the engine (7) substantially constant and second electronic means (10b) adapted to regulate the geometric characteristics of the turbocompressor (2) in order to generate maximum braking action.

10. A system as claimed in claim 9, wherein the second electronic means (10b) comprises first calculation means (76) receiving as an input a signal (N) representing speed of the engine (7) and generating as an output a signal (Sdem) representing, for each value of the input signal (N), an estimated value of the piloting signal for the turbocompressor (VGT), second calculation means (70) receiving as an input the input signal (N) and generating as an output signal (BPdem) representing, for each value of the input signal, an estimated value of the supercharging pressure of the engine, processing means (72) having an input connected to a first subtracting input (−) of a summing means (74) having a second summing input (+) connected to the output of said first calculation means (76), the summing means (74) supplying as an output a piloting signal (SBP) supplied to the variable geometry turbocompressor (2).

11. A system as claimed in claim 10, wherein the second electronic means (10b) comprises third calculation means (77) receiving as an input the signal (N) and generating as an input a signal (Smin) representing, for each value of the input signal (N) a limit value of the piloting signal which may be supplied to the variable geometry turbocompressor (2) without excessive stressing of the turbocompressor.

12. A system as claimed in claim 10, further comprising second electronic diverter means (79) having at least first and second inputs (80, 78) connected respectively to the output of the summing means (74) and to the output of the third calculation means (77), the second diverter means (79) having an output (82) which may be selectively connected with the first (80) and second (78) inputs and is adapted to supply a piloting signal to the turbocompressor (2).

13. A system as claimed in claim 12, further comprising control means (84) for the electronic diverter means (79), said control means (84) receiving as an input the piloting signal measured at the output of the summing means (74) and controlling the switching of the diverter means (79) when the piloting signal reaches a threshold value (Slim).

* * * * *

UNITED STATES PATENT AND TRADEMARK OFFICE
CERTIFICATE OF CORRECTION

PATENT NO. : 5,444,980
DATED     : August 29, 1995
INVENTOR(S) : Giancarlo DELLORA, et al It is certified that error appears in the above-indentified patent and that said Letters Patent is hereby corrected as shown below:

On the title page:

Item [22] Date Application filed should be changed from "November 26, 1993" to -- November 29, 1993--

Signed and Sealed this

Thirtieth Day of April, 1996

Attest:

BRUCE LEHMAN

*Attesting Officer*     *Commissioner of Patents and Trademarks*